R. HAMILTON.
COTTON CHECKER AND CULTIVATOR.
APPLICATION FILED OCT. 14, 1909.
946,354.
Patented Jan. 11, 1910.
2 SHEETS—SHEET 1.
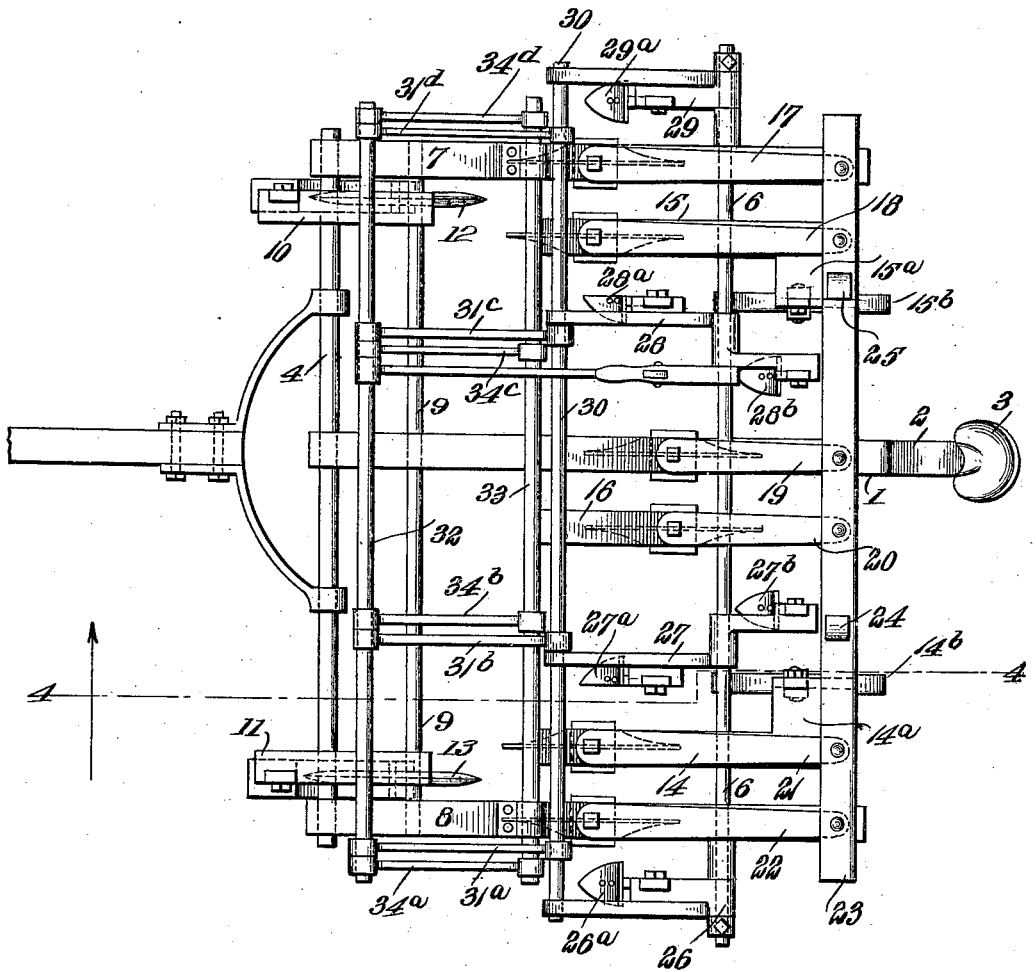
WITNESSES
INVENTOR
ROBERT HAMILTON
BY
ATTORNEYS

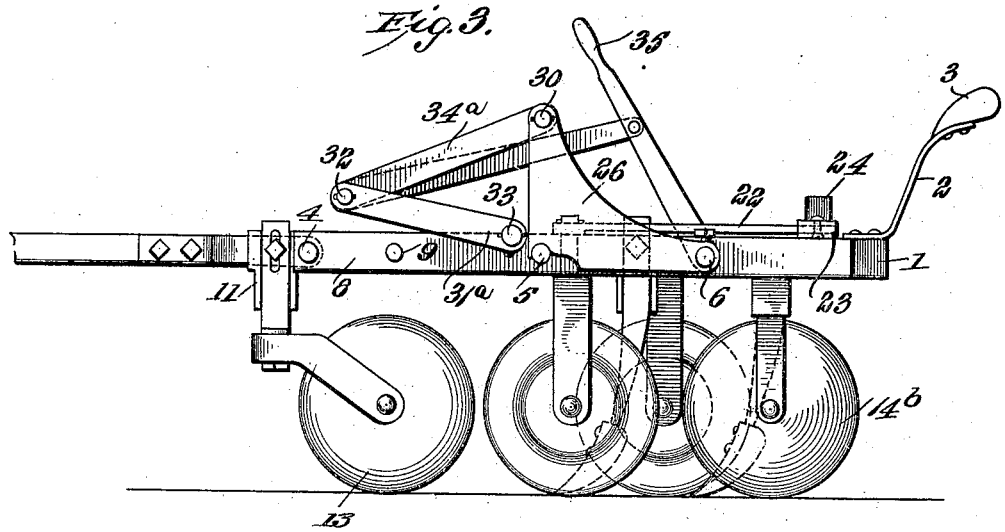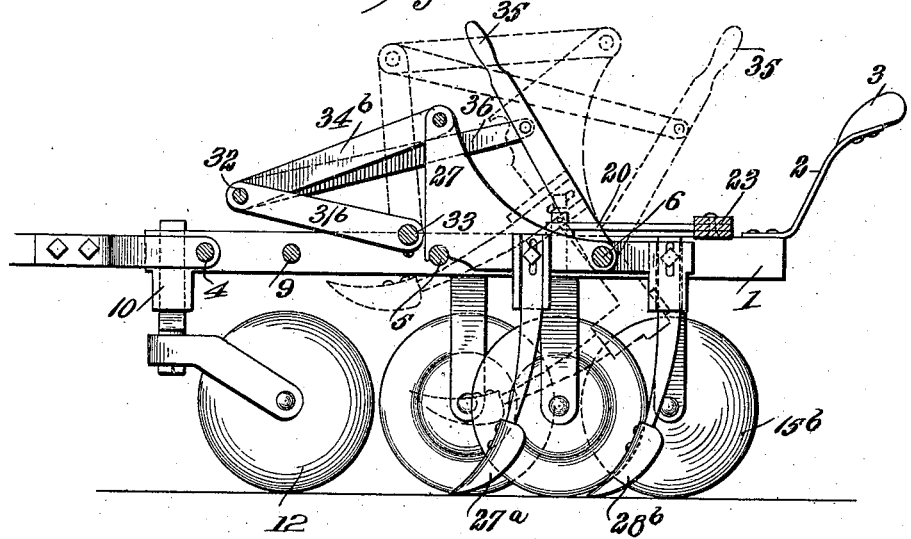

UNITED STATES PATENT OFFICE.

ROBERT HAMILTON, OF GOULDBUSK, TEXAS, ASSIGNOR OF ONE-HALF TO HENRY O. V. HUMBLE, OF GOULDBUSK, TEXAS.

COTTON CHECKER AND CULTIVATOR.

946,354.

Specification of Letters Patent.  Patented Jan. 11, 1910.

Application filed October 14, 1909. Serial No. 522,580.

*To all whom it may concern:*

Be it known that I, ROBERT HAMILTON, a citizen of the United States, and resident of Gouldbusk, in the county of Coleman and State of Texas, have invented certain new and useful Improvements in Cotton Checkers and Cultivators, of which the following is a specification.

My invention relates to improvements in devices for cultivating cotton, and it consists in the combinations, constructions, and arrangements of parts herein described and claimed.

An object of my invention is to provide means for simultaneously raising and lowering a plurality of plows in a cultivator.

A further object of my invention is to provide means for simultaneously turning a plurality of disk cutters.

Further objects and advantages will appear in the following specification, and the novel features of the device will be particularly pointed out in the appended claim.

My invention is illustrated in the accompanying drawings forming a part of this specification and in which—

Figure 1 is a plan view of the device, Fig. 2 is a detail view showing the mounting of the cutter disks, Fig. 3 is an end view, Fig. 4 is a section along the line 4—4 of Fig. 1.

The device herein shown is somewhat similar to the device disclosed in my prior application, #461,883, but differs from the latter in certain features which will be made the subject of the claim in the present application.

In carrying out my invention, I arrange a center beam 1, at the rear end of which is fastened a spring 2 bearing a seat 3. Passing through the forward end of the center beam 1 is a transverse rod 4, while similar rods 5 and 6 are disposed between the rod 4 and the seat 3. The rods 4, 5, and 6 are connected at their opposite ends by means of the end beams 7 and 8 respectively. The rod 9 also passes through the end rods 7 and 8 and the center beam. To the rods 4 and 9 are secured the disk cutter supports 10 and 11. Pivotally secured to the supports 10 and 11 are the cutter disks 12 and 13, respectively. Between the rods 5 and 6 are secured the disk cutter supports 14 and 15, these supports being provided with the laterally extending portions 14$^a$ and 15$^a$, respectively, bearing the rollers 14$^b$ and 15$^b$. The disk support 16 also extends between the rods 5 and 6 at one side of the center beam 1. A cutter disk is also pivoted in each end of the end beams 7 and 8, and in the center beam 1. To the vertical pivots of the six disks are attached the respective arms 17, 18, 19, 20, 21, and 22, as shown in Fig. 1. The ends of these arms are all pivotally connected to a common operating bar 23, which is provided with the foot lugs 24 and 25, within easy reach of the occupant of the seat 3.

The mounting for the plows is best shown in Fig. 4. It consists of a series of triangular-shaped members of the general form shown in Figs. 3 and 4. I have shown four of these members in Fig. 1 at 26 and 27, 28, and 29. The outside members 26, and 29 bear the plows 26$^a$ and 29$^a$, respectively. The inner members 27 and 28 bear the forward plows 27$^a$ and 28$^a$, on one end, and the rear plows 27$^b$ and 28$^b$ on the opposite end. All of these plows are adjustably secured to their respective supports in the manner clearly shown in Fig. 4. The triangular supports are pivoted at their rear ends by the rod 6. Their upper forward ends are pivotally attached to a common rod 30, which is pivotally connected at intervals by the arms 31$^a$, 31$^b$, 31$^c$ and 31$^d$, with the rod 32, the latter, in turn, being pivotally connected to the rod 33 by means of the arms 34$^a$, 34$^b$, 34$^c$ and 34$^d$. The rod 33 is secured to the frame members 7 and 8. The triangular-shaped supporting members 26, 27, 28, and 29 are recessed at their forward lower edges so as to take over the rod 5. The operating lever 35 is pivotally connected to the rod 32 by means of the link 36. A tongue may be attached to the front rod 4.

From the foregoing description of the various parts of the device, the operation thereof may be readily understood. The normal working position of the device is shown in full lines in Fig. 4. In this position, the lever 35 is thrown forward, thereby bringing the lower side of the triangular-shaped member directly horizontal so that both the forward and rear plows will be thrown into the ground, to the same depth. The dotted line position shows the relation of the parts when the plows are thrown out of the ground. It will be noted that with the construction thus described, a rearward pull on the link 36 causes the plow supports 26, 27, 28 and 29 to rise rapidly owing to the straightening out of the arms 31ᵇ, 34ᵇ, etc., (see Fig. 4). Moreover, the toggle-joint action results in a great increase of the power over that applied to the lever 35. The cutter disks may remain in a central position such as that shown in Fig. 1, or they may be turned on their pivots by pressing the foot lugs 24 and 25 to one side, thereby shifting the rod 23 and causing the simultaneous turning of the disks through the operation of the arms 17, 18, 19, 20, 21, and 22.

I claim:

In a cotton checker and cultivator, a frame comprising a center beam, end beams, and parallel rods connecting said end beams with said center beam, supports secured between certain of said rods, cutter disks pivoted to said supports, means for moving the cutter disks simultaneously, a series of plow supports pivotally connected to one of said parallel rods, said plow supports being connected together at their tops by a common connecting rod, a rod carried by said frame and disposed parallel with the first named rods, a series of arms pivotally connected to the last mentioned rod, a second series of arms pivotally connected with said first named arms at one end, and at the other end, to said common connecting rod, a link pivotally connected at the joint between the first set of arms and the second set, and a lever pivoted to one of said parallel rods and having a pivotal connection with said link.

ROBERT HAMILTON.

Witnesses:
E. C. Edens,
H. V. Wright.